Aug. 4, 1959  E. C. WILLIAMS  2,897,816
STEREO TRAINING UNIT
Filed Sept. 13, 1957  3 Sheets-Sheet 1

INVENTOR.
EDWIN C. WILLIAMS,
BY
McMorrow, Berman & Davidson
ATTORNEYS.

Aug. 4, 1959  E. C. WILLIAMS  2,897,816
STEREO TRAINING UNIT
Filed Sept. 13, 1957  3 Sheets-Sheet 2
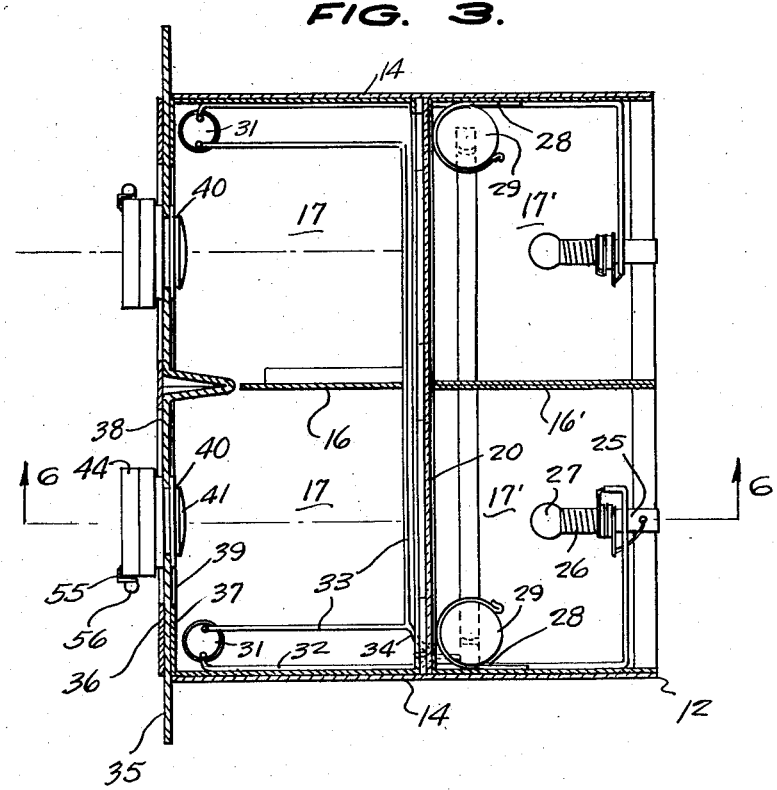
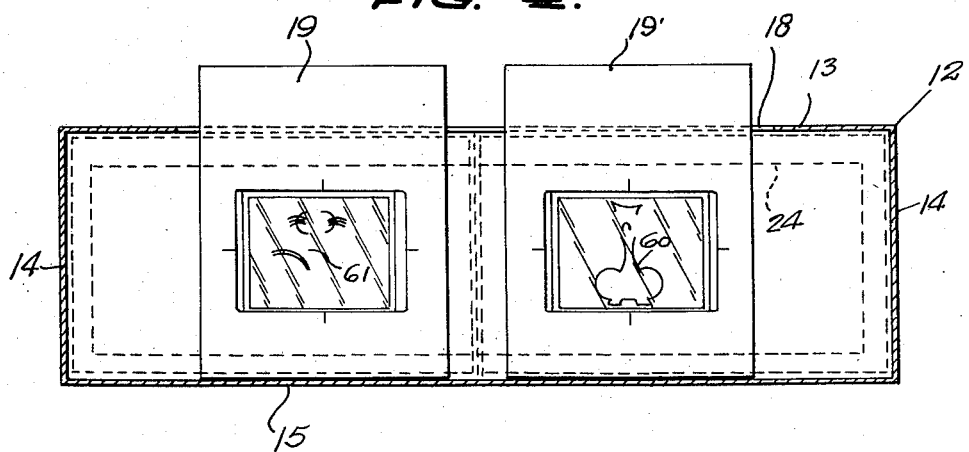
INVENTOR.
EDWIN C. WILLIAMS,
BY
McMorrow, Berman & Davidson
ATTORNEYS.

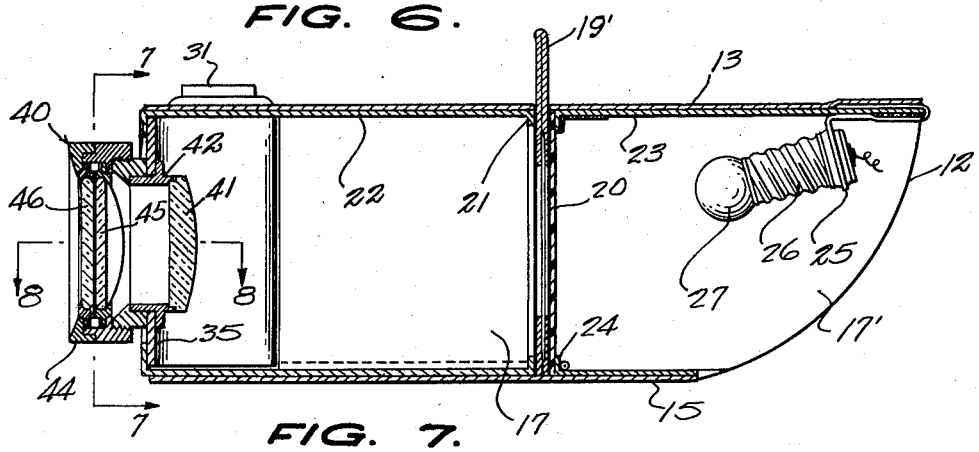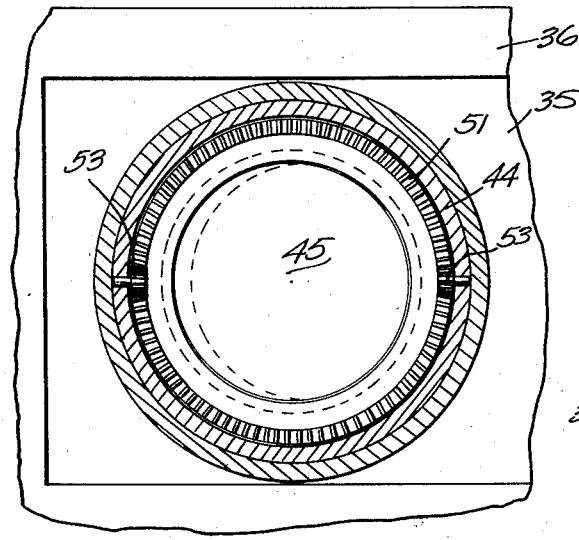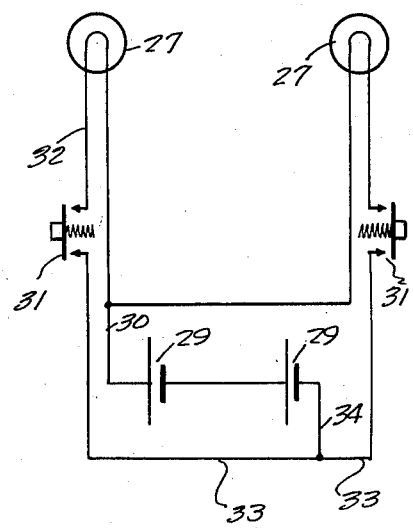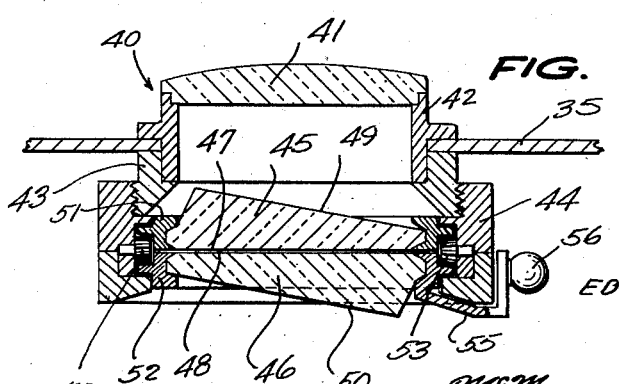

United States Patent Office 2,897,816
Patented Aug. 4, 1959

2,897,816
STEREO TRAINING UNIT
Edwin C. Williams, Merrill, Wis.

Application September 13, 1957, Serial No. 683,899

3 Claims. (Cl. 128—76.5)

This invention relates to stereoscopes and more particularly to a stereoscope device especially intended for use in training the eyes for improved stereoscopic vision and to reduce and eliminate faulty eye habits.

A main object of the invention is to provide a novel and improved training stereoscope which is simple in construction, which is easy to use, and which is provided with means for proper exercising the user's eyes in a manner to correct various defects such as ambylopia, to correct phoric conditions, resulting in strabismus, for strengthening perception, and for testing visual acuity.

A further object of the invention is to provide an improved training stereoscope for use in overcoming various visual difficulties, such as for the cure of strabismus, phorias, fusion difficulties, and the like, the stereoscope being inexpensive to fabricate, being relatively compact in size so that it is readily portable, and being provided with its own source of illumination.

A still further object of the invention is to provide an improved stereoscope for use in training patients to improve stereoscopic vision and for correcting visual defects, the stereoscope being provided with means for moving its lenses in a manner to create fusion through prismatic effects, being arranged so that the viewing lenses thereof may be adjusted laterally, and being provided with simple and efficient means for producing an adjusting the prismatic effect employed in the device for creating fusion.

Further objects and advantages of the invention will become apparent from the following description and claims, and from the accompanying drawings, wherein:

Figure 3 is a horizontal cross-sectional view taken on the line 3—3 of Figure 1.

Figure 4 is a transverse vertical cross-sectional view taken on the line 4—4 of Figure 1.

Figure 6 is an enlarged longitudinal vertical cross-sectional view taken on the line 6—6 of Figure 3.

Figure 7 is an enlarged cross-sectional detail view taken on the line 7—7 of Figure 6.

Figure 8 is an enlarged horizontal cross-sectional view taken on the line 8—8 of Figure 6.

Figure 9 is a line diagram showing the electrical connections of the stereoscope of Figures 1 to 8.

Figure 1:
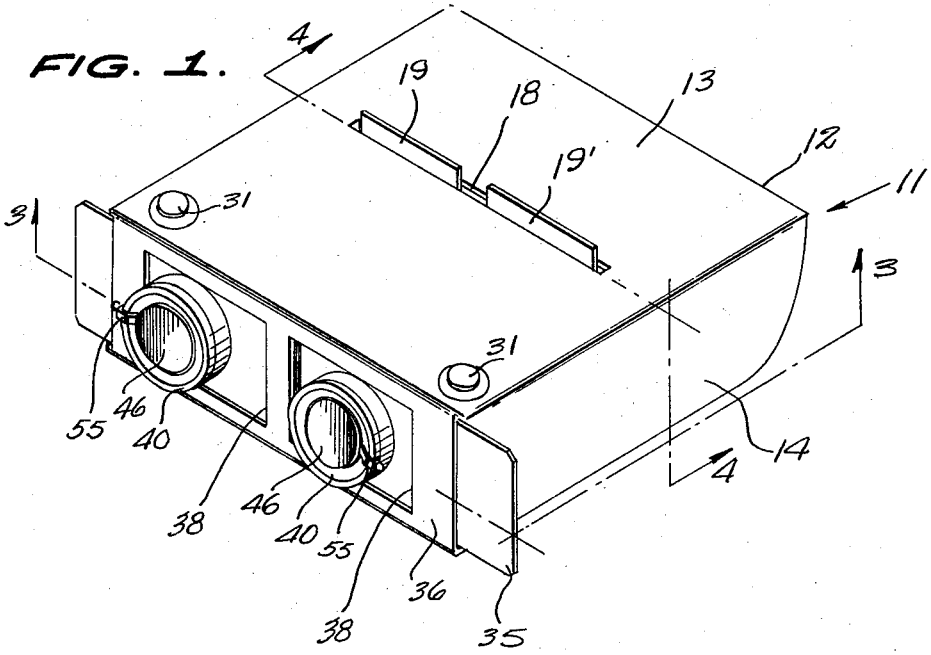
Figure 1 is a perspective view of an improved training stereoscope constructed in accordance with the present invention.

Referring to the drawings, the training stereoscope is designated generally at 11 and comprises a housing 12 of any suitable, relatively rigid material, such as stiff cardboard, plastic material, or the like, the housing comprising a top wall 13, side walls 14, 14 and a bottom wall 15. A central partition member 16 is provided inside the housing, said partition member 16 being parallel to and spaced equal distances from the side walls 14, 14, dividing the housing into a pair of side by side compartments 17, 17.

The top wall 13 is formed at its intermediate portion with a transversely extending slot 18 extending equal distances on opposite sides of the partition wall 16, said slot being adapted to receive a pair of slides 19, 19' extending vertically therethrough into the compartments 17, 17. The slides 19, 19' are receivable in respective seats defined between a transversely extending vertical, translucent diffusion plate 20 secured in the housing 12 and extending across the entire internal width of the housing, and the inturned rim 21 of a lining 22 provided in the forward portion of the housing 12.

As shown in Figure 6, the lining 22 is of substantial thickness and thus rigidifies the forward portion of the housing 12, the inturned flange 21 at the rear end of said lining serving as the forward positioning means for the slides 19, 19'. A strengthening lining 23 is provided in the rear portion of the housing 12, the lining 23 having the forward rim 24, comprising a peripheral inturned flange, serving as the positioning and securing means for the translucent diffusion plate 20.

Figure 2:
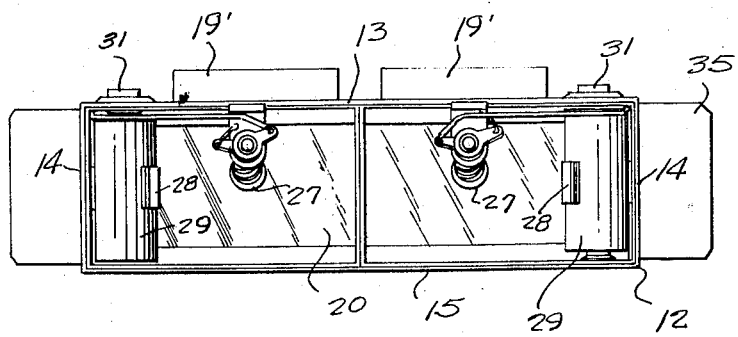
Figure 2 is a rear elevational view of the stereoscope illustrated in Figure 1.

The rear portion of a longitudinal central partition wall, shown at 16', defines respective rear compartments 17', 17' behind the diffusion plate 20. Secured at the intermediate portion of the rear edge of the top wall of each compartment 17' is a conductive bracket member 25 carrying a lamp socket 26 in which is mounted a flashlight lamp 27. Respective spring clips 28, 28 are provided at the opposite sides of the rear compartments 17', 17', said spring clips being secured to the inside surfaces of the side walls of the compartments, and being adapted to receive respective flashlight batteries 29, 29 and to secure said batteries in vertical positions, as shown in Figure 2. The batteries 29, 29 are electrically connected in series, as shown in Figure 9, and the shells of the respective lamp sockets 26, 26 are connected to a common conductor 30, which is in turn connected to the positive terminal of the series-connected flashlight batteries 29, 29.

Mounted in the forward corner portions of the top wall of housing 12 are respective normally open push-button switches 31, 31, one terminal of each switch 31 being connected by a conductor 32 to the center contact terminal of a respective lamp socket 26. The remaining terminals of the switches 31, 31 are connected by conductors 33, 33 to the negative terminal of the series-connected flashlight batteries 29, 29, through a common connecting wire 34, shown in Figure 9.

As will be readily apparent, either of the lamps 27 may be energized by closing its associated push button switch 31, both lamps being energized simultaneously when both switches 31 are closed.

Designated at 35 is a vertical, transversely extending, lens-supporting plate which is slidably mounted in the forward end portion of housing 12, as between the front vertical transverse wall 36 of the housing and the corresponding forward wall 37 of the internal lining of the forward portion of the housing. The front wall 36 of the housing is formed with a pair of rectangular apertures 38, 38 located symmetrically with respect to the longitudinal central plane of the housing, and the internal lining of the forward portion of the housing is formed with a rectangular aperture 39 of the same height as the apertures 38 and of a width equal to the distance between the outer vertical edges of the apertures 38, whereby the apertures 38, 38 are in registry with the inner aperture 39.

The lens supporting plate 35 is slidable between the walls 36 and 37, as above described, and has mounted thereon a pair of lens assemblies 40, 40 which are employed by the user to view the illuminated slides 19, 19'. Each lens assembly 40 comprises an inner lens element 41 rigidly mounted in the rear bow portion 42 of the unit, Also included in each assembly is a forward ring portion 43 on which is threadedly engaged a prism-supporting ring 44. Rotatably mounted in the supporting ring 44 are a pair of triangular prism elements 45 and 46, said prism elements having opposing, closely adjacent inside faces 47 and 48, as shown in Figure 8, said faces being disposed substantially in a transverse vertical plane parallel to and forwardly adjacent to the lens-supporting plate 35. The prism members 45 and 46 have respective inclined outer faces 49 and 50 which may be rotated to various skewed positions with respect to the common transverse vertical plane defined by the inside faces 47 and 48.

Means are provided for gearingly coupling each pair of prisms 45 and 46 for simultaneous rotation in opposite directions. Thus, the prism 45 is mounted in a ring 51 formed with inwardly facing gear teeth and the prism 46 is mounted in a ring 52 formed with similar inwardly facing gear teeth, opposing the gear teeth of the ring 51. The gear teeth of the rings 51 and 52 meshingly engage with respective pinions 53, 53 journaled in the main supporting ring 44 at diametrically opposite positions thereof, as shown in Figure 8. An operating arm 55 is secured to each ring 52, extending around the forward rim of the supporting ring member 44 and being provided at its outer ends with a knob 56. By rotating the operating knob 56, the respective prisms 45 and 46 may be rotated simultaneously in opposite directions so as to vary the combined prismatic effect of the cooperating triangular prisms 45 and 46.

As will be further apparent, the lens assembly supporting plate 35 may be shifted laterally, so as to provide offset viewing conditions relative to the illuminated slides 19, 19' for use in varying or compensating for horizontal imbalances in either eye.

Figure 5:
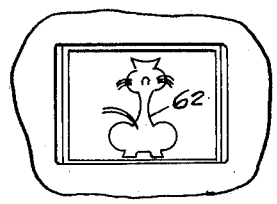
Figure 5 is a fragmentary front elevational view illustrating the apparent image seen by a person with corrected stereoscopic vision when viewing the pair of slides illustrated in Figure 4 through the stereoscope.

As shown in Figure 4, the slides 19 and 19' may comprise the respective components of a desired composite image, for example, the slide 19' may contain the elements 60 and slide 19 may contain the elements 61 which superimpose when viewed stereoptically, to create the apparent fused image 62 shown in Figure 5, when the proper corrections have been made to take care of the viewer's stereoscopic vision faults, as by laterally adjusting the lens-supporting plate 35 or by angularly adjusting the prismatic variation arms 55, or by a combination of such operations.

Various types of exercises may be performed by using the training device 11, as will be readily apparent to those skilled in the art. For example, the amount of normal lighting obtained through the open rear end of the housing 12 may be reinforced by energizing either of the lamps 27 to build up the light in either of the compartments 17', or both lamps 27 may be simultaneously energized, by simultaneously closing both pushbutton switches 31, 31. When one of the switches only is closed, the eye viewing the slide with reinforced illumination will be stimulated and will function more actively than the other eye. Thus, the eyes may be exercised by alternating the illumination of the respective lens 27, 27 at a suitable rate.

As will be readily apparent, the training device 11 may be employed to perform a large variety of different exercises which may be prescribed in the process of transferring an individual from monocular to binocular vision. The aforesaid exercises may consist of various methods of adjustments of the vertical lens-support plate 35, adjustments of the respective cooperating rotatable prism pairs 45 and 46, manipulation of the switches 31, 31 to provide variations in the intensity of illumination of the respective training slides employed, and various combinations of the aforesaid adjustments and manipulations.

While a specific embodiment of an improved training stereoscope has been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. A training stereoscope of the character described comprising a housing having a pair of side-by-side compartments, means to support stereoscopic slides in the rear portions of said compartments, means to selectively illuminate the rear portions of the compartments, a lens-supporting plate slidably mounted on the forward end of said housing transverse to the compartments and being adjustable laterally relative to the compartments, respective lenses mounted on the supporting plate inwardly adjacent the compartments, and respective prism assemblies mounted on the lens-supporting plate forwardly adjacent the lenses, each prism assembly comprising a pair of triangular prisms rotatably mounted adjacent each other and being rotatably adjustable around the optical axis of the adjacent lens, the pairs of prisms having transverse, closely adjacent inside faces, means gearingly coupling the prisms of each pair for simultaneous rotation in opposite directions, and an outwardly projecting operating arm secured to one prism of each pair of prisms.

2. A training stereoscope of the character described comprising having a pair of side-by-side compartments, means to support stereoscopic slides in the rear portions of said compartments, means to selectively illuminate the rear portions of the compartments, a lens-supporting plate slidably mounted on the forward end of said housing transverse to the compartments and being adjustable laterally relative to the compartments, respective lenses mounted on the supporting plate inwardly adjacent the compartments, and respective prism assemblies mounted on the lens-supporting plate forwardly adjacent the lenses, each prism assembly comprising a pair of triangular prisms rotatably mounted adjacent each other and being rotatably adjustable around the optical axis of the adjacent lens, the pairs of prisms having transverse, closely adjacent inside faces, means gearingly coupling the peripheral portions of the prisms of each pair for simultaneous rotation of the prisms of each pair in opposite directions, and an outwardly projecting operating arm secured to the forward prism of each pair of prisms.

3. A training stereoscope of the character described comprising a housing having a pair of side-by-side compartments, means to support stereoscopic slides in the rear portions of said compartments, means to selectively illuminate the rear portions of the compartments, a lens-supporting plate slidably mounted on the forward end of said housing transverse to the compartments and being adjustable laterally relative to the compartments, respective lenses mounted on the supporting plate inwardly adjacent the compartments, and respective prism assemblies mounted on the lens-supporting plate forwardly adjacent the lenses, each prism assembly comprising a supporting ring spaced forwardly from and axially aligned with the adjacent lens, a pair of triangular prisms rotatably mounted adjacent each other in said supporting ring and being rotatably adjustable around the optical axis of the adjacent lens, the pair of prisms having transverse, closely adjacent inside faces, means gearingly coupling the prisms of each pair for simultaneous rotation in opposite directions, and an outwardly projecting operating arm secured to the forward prism of each pair of prisms and extending around the rim of the associated supporting ring.

References Cited in the file of this patent

UNITED STATES PATENTS

| 686,616 | Johnquest | Nov. 12, 1901 |
| 1,808,176 | Pieper | June 2, 1931 |
| 2,089,863 | Updegrave | Aug. 10, 1937 |
| 2,817,332 | Shlechter | Dec. 24, 1957 |

FOREIGN PATENTS

| 754,293 | Great Britain | Aug. 8, 1956 |